(12) United States Patent
Rosiene et al.

(10) Patent No.: US 8,170,098 B2
(45) Date of Patent: May 1, 2012

(54) OPTO-ELECTRONIC VIDEO COMPRESSION SYSTEM

(75) Inventors: Joel A. Rosiene, Colchester, CT (US); Barry E. Mapen, Newtown, CT (US); James B. Perkins, Farmington, CT (US); Alexander B. Lerman, Newtown, CT (US)

(73) Assignee: General Dynamics Information Technology, Inc., Fairfax, VA (US)

( * ) Notice: Subject to any disclaimer, the term of this patent is extended or adjusted under 35 U.S.C. 154(b) by 828 days.

(21) Appl. No.: 12/250,261

(22) Filed: Oct. 13, 2008

(65) Prior Publication Data

US 2009/0060031 A1 Mar. 5, 2009

Related U.S. Application Data

(63) Continuation of application No. 10/050,063, filed on Jan. 14, 2002, now abandoned.

(60) Provisional application No. 60/261,363, filed on Jan. 12, 2001.

(51) Int. Cl.
  *H04N 7/12* (2006.01)
(52) U.S. Cl. .............................. 375/240.01; 348/222.1
(58) Field of Classification Search .............. 375/240.01
  See application file for complete search history.

(56) References Cited

U.S. PATENT DOCUMENTS

| | | | |
|---|---|---|---|
| 4,347,834 A | 9/1982 | York | |
| 5,043,827 A | 8/1991 | Beikirch | |
| 5,248,876 A | 9/1993 | Kerstens et al. | |
| 5,844,231 A * | 12/1998 | Suzuki et al. | 250/201.2 |
| 5,903,659 A | 5/1999 | Kilgore | |
| 6,195,125 B1 | 2/2001 | Udagawa et al. | |
| 6,650,361 B1 * | 11/2003 | Shiomi | 348/218.1 |
| 6,753,906 B2 * | 6/2004 | Shimada | 348/219.1 |
| 6,937,659 B1 | 8/2005 | Nguyen et al. | |
| 7,012,749 B1 | 3/2006 | Mendlovic et al. | |
| 7,317,486 B2 * | 1/2008 | Toyofuku et al. | 348/333.11 |
| 2003/0142869 A1 | 7/2003 | Blaettermann et al. | |
| 2004/0085460 A1 | 5/2004 | Shiomi | |
| 2007/0019104 A1 | 1/2007 | Inoue et al. | |
| 2007/0177880 A1 * | 8/2007 | Karasikov et al. | 398/170 |

OTHER PUBLICATIONS

*American Institute of Aeronautics and Astronautics*; Paper No. AIAA-2001-0127, Joel M. Grasmeyer, and Matthew T. Keennon, "Development of the Black Widow Micro Air Vehicle."
http://www.fas.org/irp/program/collect/mav.htm, Jan. 6, 2002, "Micro-Air Vehicles (MAVs)."
http://www.darpa.mil/tto/programs/mav.html, Jan. 6, 2002, "Micro Air Vehicles (MAV)."

(Continued)

*Primary Examiner* — Jay Patel
*Assistant Examiner* — Jessica Prince
(74) *Attorney, Agent, or Firm* — Ingrassia Fisher & Lorenz, P.C.

(57) ABSTRACT

An opto-electonic video compression system is disclosed including a lens element for transmitting light of an image and having one or more lenses, each lens having a predetermined focal length. A sensor array includes a first sensor for receiving focused light from the lens element and a second for receiving defocused light from the lens element, wherein the first sensor includes X.times.Y pixels and samples the focused light at each of the X.times.Y pixels, and the second sensor includes X/2.times.Y/2 pixels and samples the defocused light at each of the X/2.times.Y/2 pixels. An electronic differencing element in communication with the first and second sensor is also included for differencing the coefficients of co-located pixels.

20 Claims, 17 Drawing Sheets

OTHER PUBLICATIONS http://www.defenselink.mil/news/Dec_1997/b12121997_bt676-97.html, Jan. 6, 2002, "DARPA Selects Micro Air Vehicle contractor."

http://www.aerovironment.com/area-aircraft/unmanned.html, Jan. 6, 2002, "Unmanned Arial Vehicles."

http://www.memagazine.org/contents/current/features/palmsize/palmsize.html, Jan. 6, 2002, Steven Ashley, "Palm-Size Spy Plane."

http://www.darpa.mil/tto/MAV/mav_auvis.html, Jan. 6, 2002, James M. McMichael and Michael S. Francis, Micro Air Vehicles—Toward a New Dimension in Flight.

http://www.yorku.ca/eye/psf.htm, Aug. 8, 2001, "Point and Line Spread Functions."

http://www.yorku.ca/eye/psfl.htm, Aug. 8, 2001, "Point Spread Function."

http://www.yorku.ca/eye/spread.htm, Aug. 8, 2001, "Spread Functions."

http://www.yorku.ca/eye/integral.htm, Aug. 8, 2001, "Schematic Representing Integration."

http://www.yorku.ca/eye/2_point2.htm, Jan. 6, 2002, "Line Spread Distributions of Point Sources."

http://www.yorku.ca/eye/sqwave.htm, Aug. 8, 2001, "Square Wave Grating."

http://www.yorku.ca/eye/mtf.htm, Aug. 8, 2001, "Modulation Transfer Function."

http://www.yorku.ca/eye/mtf2.htm, Jan. 6, 2002, "Modulation of an Image as a Function of Spatial Frequency."

http://www.yorku.ca/eye/mtf3.htm, Jan. 6, 2002, "Modulation Transfer Function."

http://www.yorku.ca/eye/mtf4.htm, Jan. 6, 2002, "Typical Low Pass MTF."

http://www.iso.vilspa.esa.es/manuals/HANDBOOK/III/cam_hb/node28.html, Aug. 8, 2001, "The Point Spread Function (PSF)."

http://www.irf.se/~bjorn/thesis/node26.html, Aug. 8, 2001, "Point Spread Function."

* cited by examiner

- D = 0: no defocus (640x480 array)
- ■ D = 2: covers approx. 2x2 region (320x240 array)
- ◀ D = 4: covers approx. 4x4 region (160x120 array)
- ✦ D = 8: covers approx. 8x8 region (80x60 array)

US 8,170,098 B2

OPTO-ELECTRONIC VIDEO COMPRESSION SYSTEM

CROSS-REFERENCE TO RELATED APPLICATIONS

This is a nonprovisional continuation application of U.S. patent application Ser. No. 10/050,063, filed on Jan. 14, 2002 now abandoned which claims the benefit of provisional application bearing application No. 60/261,363, filed on Jan. 12, 2001, and entitled "Optical Video Compression System and Method." The entire contents of the provisional application are incorporated by reference herein.

BACKGROUND OF THE INVENTION

1. Field of the Invention

The present invention relates generally to a low power video compression system and, more particularly, to a video compression system that combines optical, electronic analog, and digital technologies to optimize its power consumption characteristics.

2. Background of the Related Art

Miniaturization of electronic system components has been a goal of designers since the dawn of electronics. The driving force behind the move to miniaturize electronic components primarily stems from the need to make the products in which they are used more portable. Commercial products that have made great strides in this area include, for example, portable laptops and CD-players.

An area where miniaturization is playing a major role is in the design of micro air vehicles ("MAV"). MAV's are airborne vehicles that are no larger than 15 centimeters (six inches) in length, width or height and perform a useful military mission at an affordable cost. The military envisions that individual soldiers at the platoon level or below will use such vehicles for reconnaissance and surveillance, battle damage assessment, targeting, emplacing sensors, communications relays, or for sensing chemical, nuclear, or biological substances. Commercial applications also exist including traffic monitoring, border surveillance, fire and rescue operations, forestry, wildlife surveys power-line inspections, and real-estate aerial photography. The vehicles will have to be able to conduct real-time imaging, have ranges up to 10 kilometers and speed of up to 30 miles per hour for missions that are 20 minutes to two hours long.

A MAV prototype was test flown on August 2000. The "Black Widow" MAV (AeroVironment, Inc., Simi Valley, Calif.) had an endurance of 30 min., maximum range of 1.8 km, and a mass of 80 g. Through an extensive evaluation, it was determined that the combination of a battery as an energy source and motor driven propeller provided the best propulsion system. A large portion of the MAV's mass is due to the mass of the battery. Therefore, any improvement that reduces the need for battery power will improve the performance by allowing the battery to be reduced in size, resulting in a lighter aircraft, or allowing the battery to remain the same size, resulting in more power for increasing endurance.

The Black Widow MAV included a video payload including a custom color CMOS camera and a custom video transmitter. The color CMOS video camera had a mass of 1.7 g, utilized 150 mW of power, and had a resolution of 510.times.488 pixels. The video transmitter had a mass of 1.4 g, power input of 550 mW, and power output of 100. To get the video from onboard to the ground a radio frequency (RF) transmitter operating at 2.4 GHz was used. The transmitter takes the analog video stream as an input, modulates it using frequency modulation (FM), and outputs it as a RF signal. A detailed discussion of the Black Widow MAV can be found in "Development of the Black Widow Micro Air Vehicle" by Joel M. Grasmeyer and Matthew T. Keennon of AeroVironment, Inc., American Institute of Aeronautics and Astronautics, Paper Number AIAA-2001-0127.

There are number of disadvantages associated with present video systems intended for use in highly portable equipment such as the Black Widow MAV including relatively high power consumption, high noise, and low range.

SUMMARY OF THE DISCLOSURE

An opto-electronic video compression system is disclosed including a lens element for transmitting light of an image and having one or more lenses, each lens having a predetermined focal length. A sensor array includes a first sensor for receiving focused light from the lens element and a second sensor for receiving defocused light from the lens element, wherein the first sensor includes X.times.Y pixels and samples the focused light at each of the X.times.Y pixels, and the second sensor includes X/2.times.Y/2 pixels and samples the defocused light at each of the X/2.times.Y/2 pixels. An electronic differencing element in communication with the first and second sensor is also included for differencing the coefficients of co-located pixels.

The lens element may include a single lens. In such case, the system may include a beam splitter between the lens element and the sensor array for transmitting a first percentage of the light from the image to the first sensor and a second percentage of the light from the image to the second sensor.

The lens element may include a single collimated lens. In such case, the system may include a beam splitter between the lens element and the sensor array for transmitting a first percentage of the light from the image to the first sensor and a second percentage of the light from the image to the second sensor, and the system may further include a first lens between the beam splitter and the first sensor for providing the focused light on the first sensor, and a second lens between the beam splitter and the second sensor for providing the defocused light on the second sensor.

These and other embodiments of the present invention are described in detail herein below.

BRIEF DESCRIPTION OF THE DRAWINGS

So that those of ordinary skill in the art to which the subject invention pertains will more readily understand how to make and use the systems described herein, embodiments of the invention will be described in detail with reference to the drawings, wherein.

DETAILED DESCRIPTION OF PREFERRED EMBODIMENTS

Reference is now made to the accompanying figures for the purpose of describing, in detail, embodiments of the present invention. The figures and accompanying detailed description are provided as examples of the invention and are not intended to limit the scope of the claims appended hereto.

Figure 1:
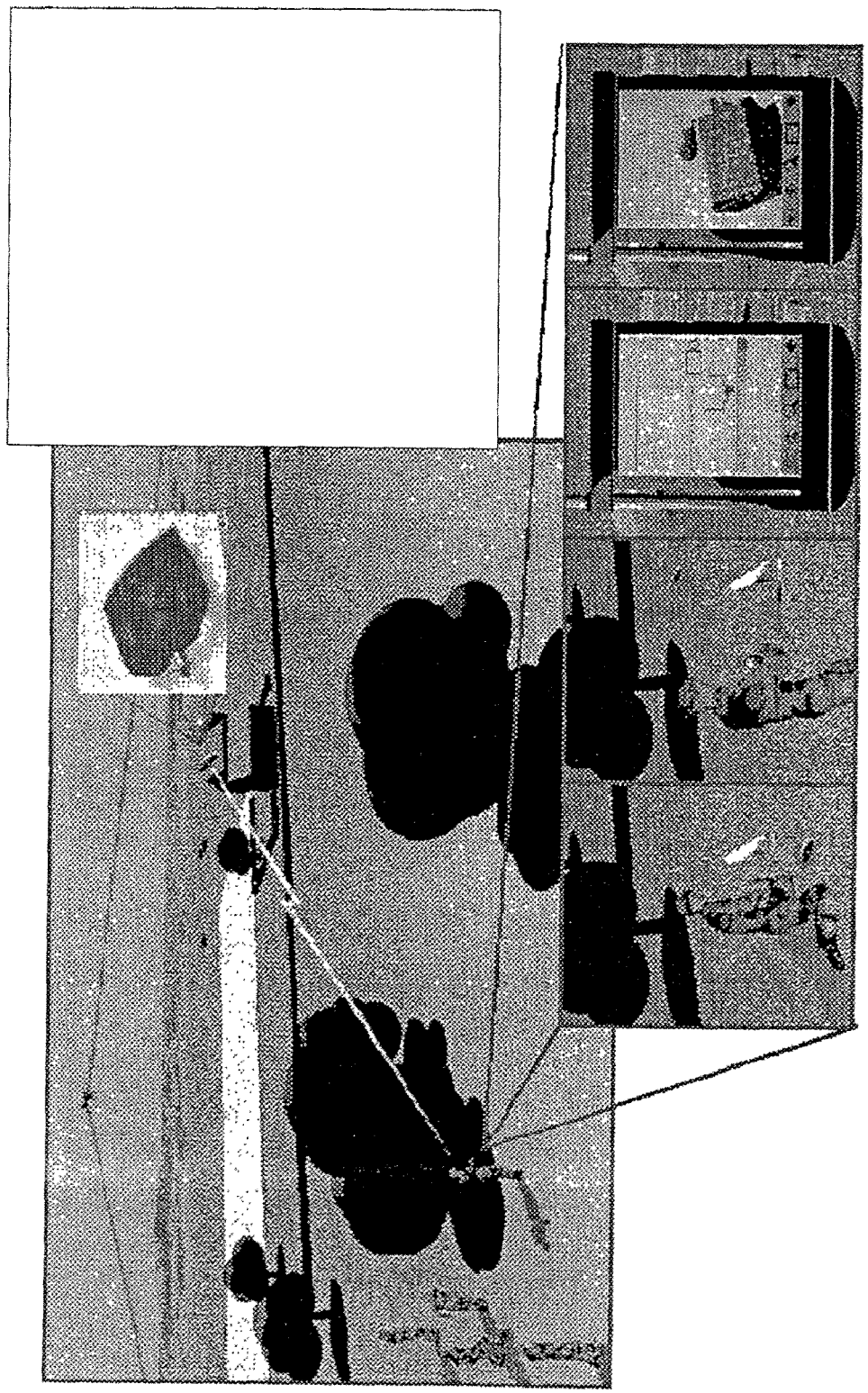
FIG. 1 illustrates the use of a MAV by military personal to survey a remote location.

Referring to FIG. 1, a MAV is shown in use by military personal to survey a remote location. The present system may be used on such MAVs as it provides superior performance in comparison to presently available video systems.

General characteristics of an embodiment of the present invention include an optical/electronic analog device for performing transform functions, electronic analog quantizer, electronic analog model maintenance, and digital bit-coding and packing.

The present invention will perform a full 60% of its computational efforts by optical components, 27% by electronic analog components, 11% by digital components, and only 2% by software. This system profile should lead to significant power efficiencies—especially in comparison to current-day software-based and hardware-based video compression systems.

An embodiment of the present invention uses hierarchical subband decomposition. Popular among such decomposition methods is the Mallat decomposition. The Mallat decomposition describes one way filters may be applied. Another general category of transform techniques can be described as the Standard decomposition technique. The basic difference is that the Mallat decomposition technique alternates rows and columns while the Standard decomposition technique computates all of the rows and then all of the columns. The hierarchical subband decomposition technique inherently performs two-dimensional spatial filtering in which it is not possible to decompose in terms of rows and columns. Other transformation techniques may be used for the present invention. A more accurate description of the transform produced by the present invention is a "wavelet approximation". It is anticipated that a video system utilizing the present invention may be made using other transform decomposition techniques including discrete cosine transform (DCT), discrete sine transform, Fourier transform.

An embodiment of the present invention also makes use of a Mid-Rise Linear quantizer. Utilizing this quantizer, coefficients are divided by a fixed quantity. This effectively breaks the region into equally spaced intervals, which greatly reduces the variance of coefficients. All values within an interval are mapped to the center of that interval; perceptually, intervals may not be equally spaced. Quantum recovery is obtained by multiplying by the fixed quantizer value.

Other quantizers that may be used include a Lloyd-Max, Vector, Mid-Rise Logarithmic, Table Based quantizer. These quantizers require a significantly greater amount of computational effort but do not perform much better than a Mid-Rise Linear quantizer. That is, although they behave similar to a Mid-Rise Linear, they are formulated very differently.

Those of ordinary skill in the art will appreciate that typical compression systems, for example MPEG, maintain a model in the image domain for synchronization. In order for the quantizer to make use of the model, the data must be transformed and quantized. The data is then inverse quantized and inverse transformed. Thereafter, the data is used as a reference model for the next frame to be encoded. It should be appreciated that an error is introduced when the model is quantized and transformed to the quantizer in the frequency domain. In fact, regardless how consistently "clean" the bitstream to the decoder is (e.g., data never dropped out, the communication link is ideal), without synchronization a codec will eventually lose synchronization with the decoder leading to an undesirable case. Ideally, the encoder maintains a model that is identical to the data that the decoder receives. The present invention uniquely locates a model after the quantizer to significantly reduce the introduction of transformation errors.

The present invention also makes use of Static Entropy (Huffman) coding for coefficient representation and Linear Ordering for coefficient ordering when bit coding quantized output. Other coefficient representation techniques may be used including Run Length coding, Differential coding, Dynamic Entropy (Huffman) coding, and Table-Based (Look-Up) coding. In addition, other coefficient ordering techniques may be used including EZW Ordering, Zigzag Ordering (commonly used with DCT), and Most to Least Significant Bit Ordering.

Figure 2:
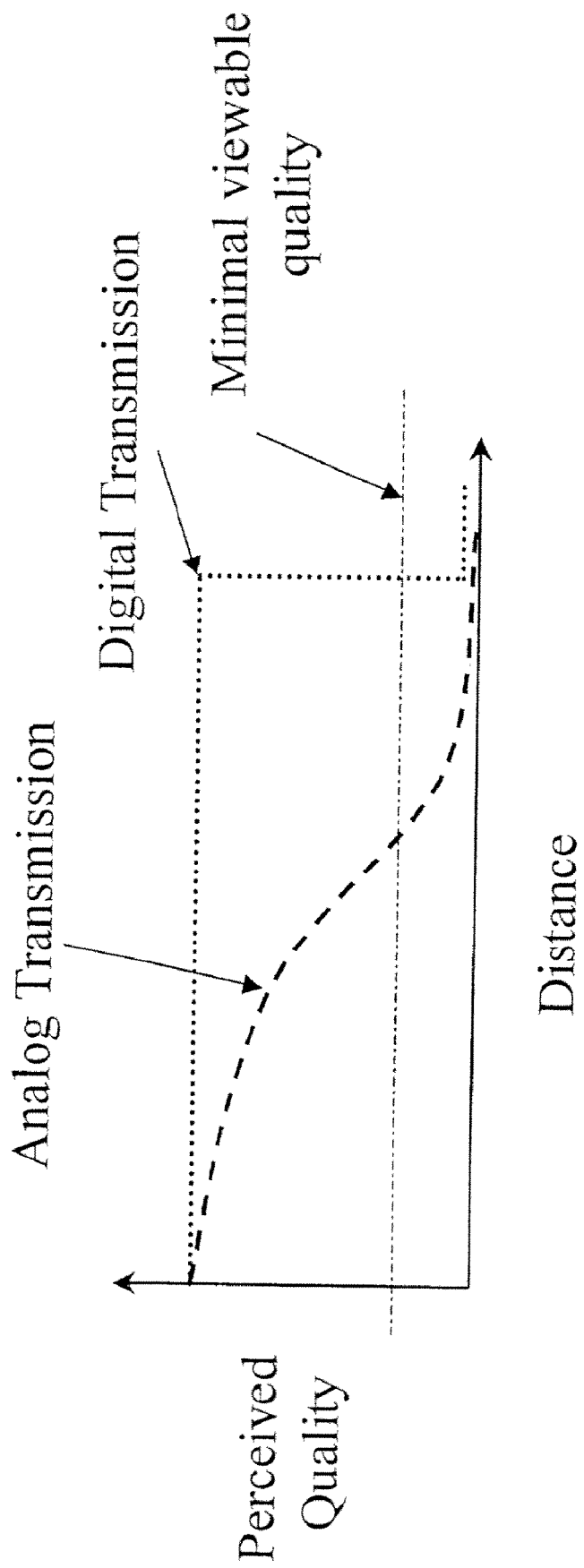
FIG. 2 is a graph the shows an advantage of transmitting data digitally instead of by analog signal.

The present invention transmits video data digitally. There are a number of advantages for utilizing a digital transmission system. For example, referring to FIG. 2, the transmission characteristics of digital transmission and analog transmission are plotted on a graph of distance verses perceived quality. Digital transmission is shown to be more consistent over a greater distance. Other advantages for selecting digital transmission over analog transmission signals include improved noise immunity and longer MAV range (or lower power transmission).

In addition, the type of signature given by an analog transmission signal allows a third party to easily track the transmission. Because a digital transmission may sit just above the noise threshold, it is much harder to find the source (i.e., increased stealth). Furthermore, digital signals are more versatile than analog signals in that they can be encrypted, make use of frequency hopping, and make use of techniques for avoiding jamming. Other systems that are using digital transmission for video transmission include satellite TV and digital cable.

Referring in particular to the video system used on the Black Widow MAV, another disadvantage of an analog system is it is FM analog. Such systems are easily jammed by activating a standard FM transmitter and increasing the power output. Under such circumstances, the Black Widow MAV will loose its video capability. Analog also requires more power in comparison to equivalent digital systems, therefore, analog either has a lower range when it uses the same amount of power or it requires more power (equating to a larger battery) to give the MAV a range that is equivalent to a digital video system. Generally, digital transmission systems provide a better power to transmission-distance ration when compared with that of an analog transmission system.

Figure 3:
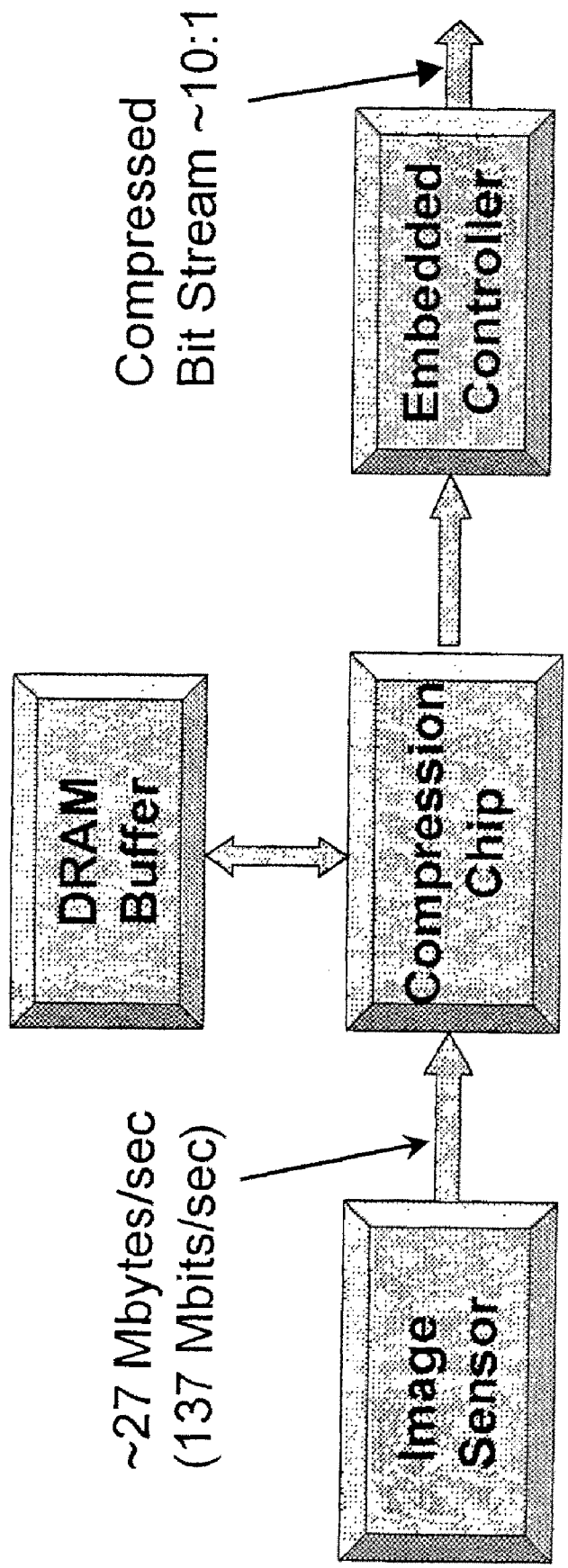
FIG. 3 illustrates a prior art video compression system.

Referring to FIG. 3, a typical hardware digital video system is illustrated. The entire system is digital, that is, the data coming out of the image sensor is digital, the compression chip is digital, the controller is digital, the DRAM is digital, and a digital radio (not shown) is used to transmit the data. An example of a product that uses such a system is the TiVo video system (TiVo, Inc., Alviso, Calif.). However, TiVo does not transmit the data, instead it stores it on hard disk. Typical MPEG-based compression chips (and their cost in power consumption) include Emblaze MPEG encoder (0.7 W) and VWeb MPEG encoder (0.8 W). A typical wavelet-based encoder compression chip is Analog Devices' ADV601 encoder (0.5-1.35 W). As will be described in detail herein below, the present invention is capable of performing compression at a power level that is an order of magnitude better (.about.0.05-0.135 W). Regarding the buffer, in an embodiment of the present invention DRAM is not used (instead, analog memory is used), therefore, further power savings are obtained.

As described above, the Black Widow MAV is not using a digital video system. In fact, the video system on the Black Widow does not use compression. The data goes from an analog image sensor to an analog transmitter.

Figure 4:
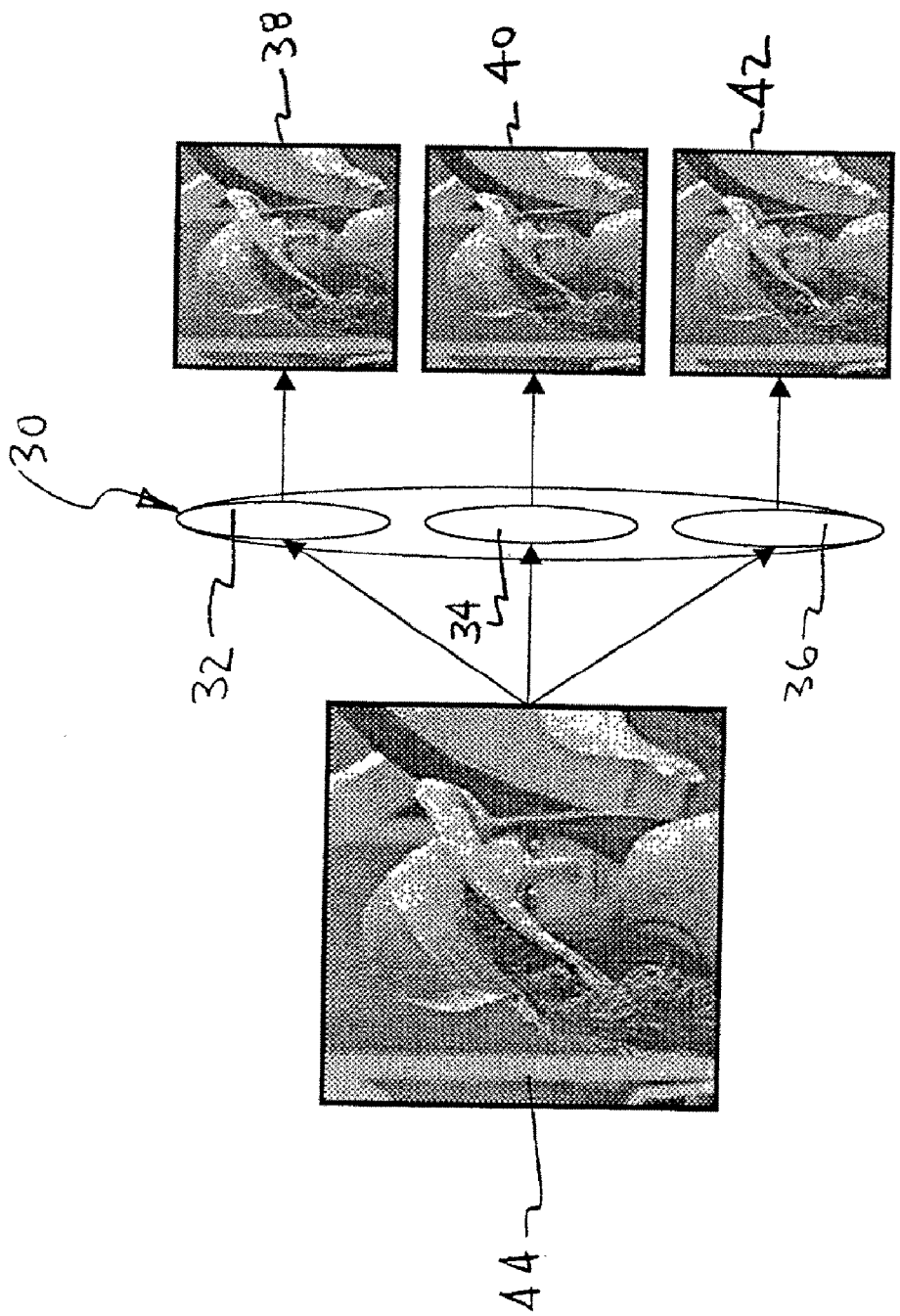
FIG. 4 illustrates an optical element having multiple lenses for producing multiple images.

Referring to FIG. 4, an optical element 30 for use in an embodiment of a lens/sensor system of the present invention includes three lenses 32, 34, and 36. The optical element 30 produces three separate images 38, 40, 42 from a base image 44. The lenses can have identical focal lengths or different focal lengths. It is notable that the parallel lenses of the optical element 30 would tend to be stereoscopic, in particular when the base image 44 is relatively close (e.g., a meter) to the optical element 44.

Basic optics teaches that images may be added by focusing them to a single sensor. However, images cannot be subtracted because incoherent light has only positive amplitudes. Images may be defocused by adjusting the distance between the lens and the sensor. It has been learned that defocusing is the equivalent to low-pass filtering. For this reason, defocusing may be used to replace 50% of a transform using optical techniques. The extent of low-pass filtering is determined by how much blurring is done. The advantage of using passive optics is that it does not require any energy to add or defocus (blur) images.

Figure 5:
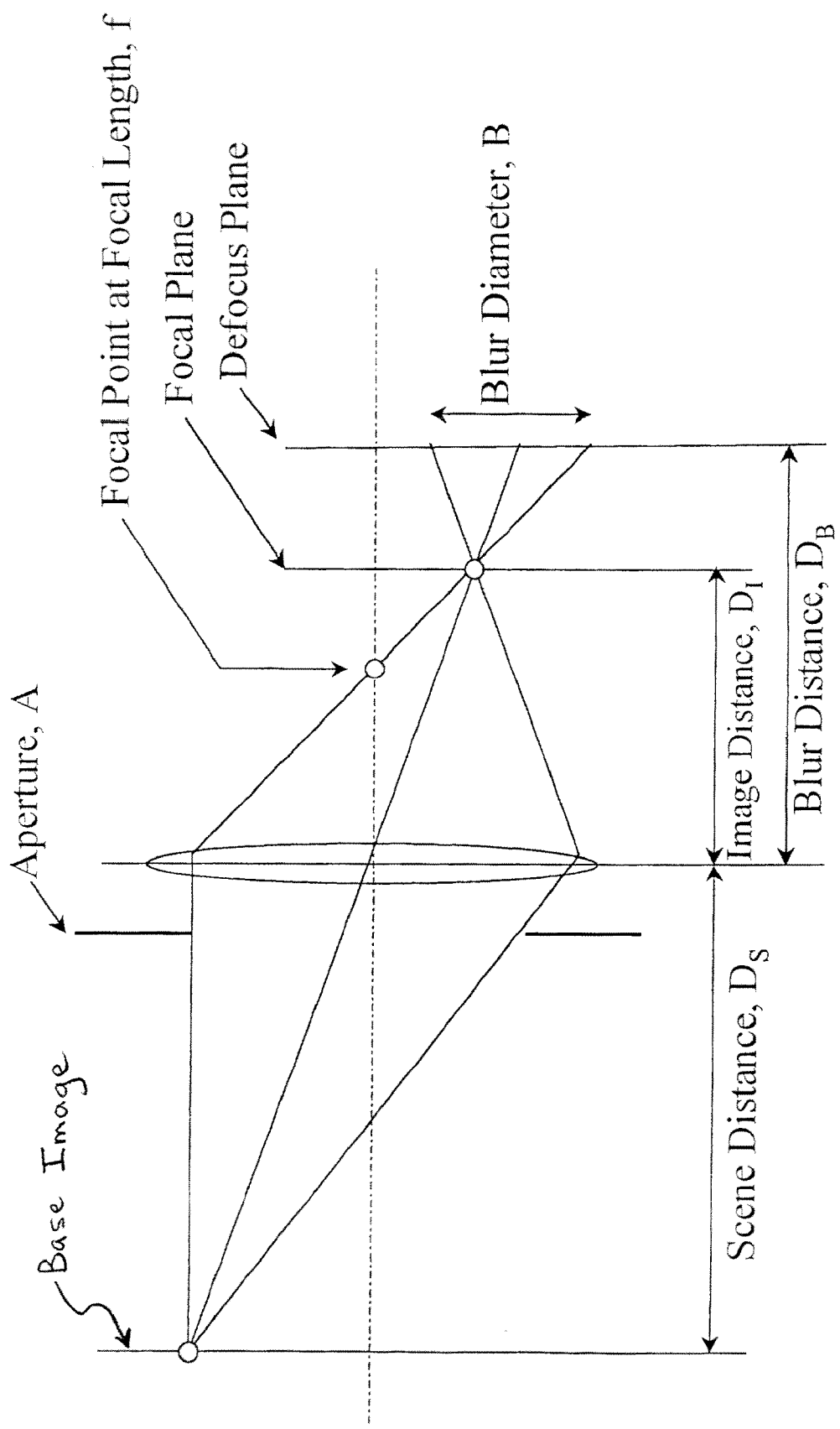
FIG. 5 illustrates a standard lens and its optical geometry.

FIG. 5 illustrates basic optic geometry for a single lens. A desired blur diameter (B) is readily obtained by shifting the focal plane from image distance (D1) to blur distance (DB). The desired blur diameter (B) will appear on a defocus plain.

Figure 6:
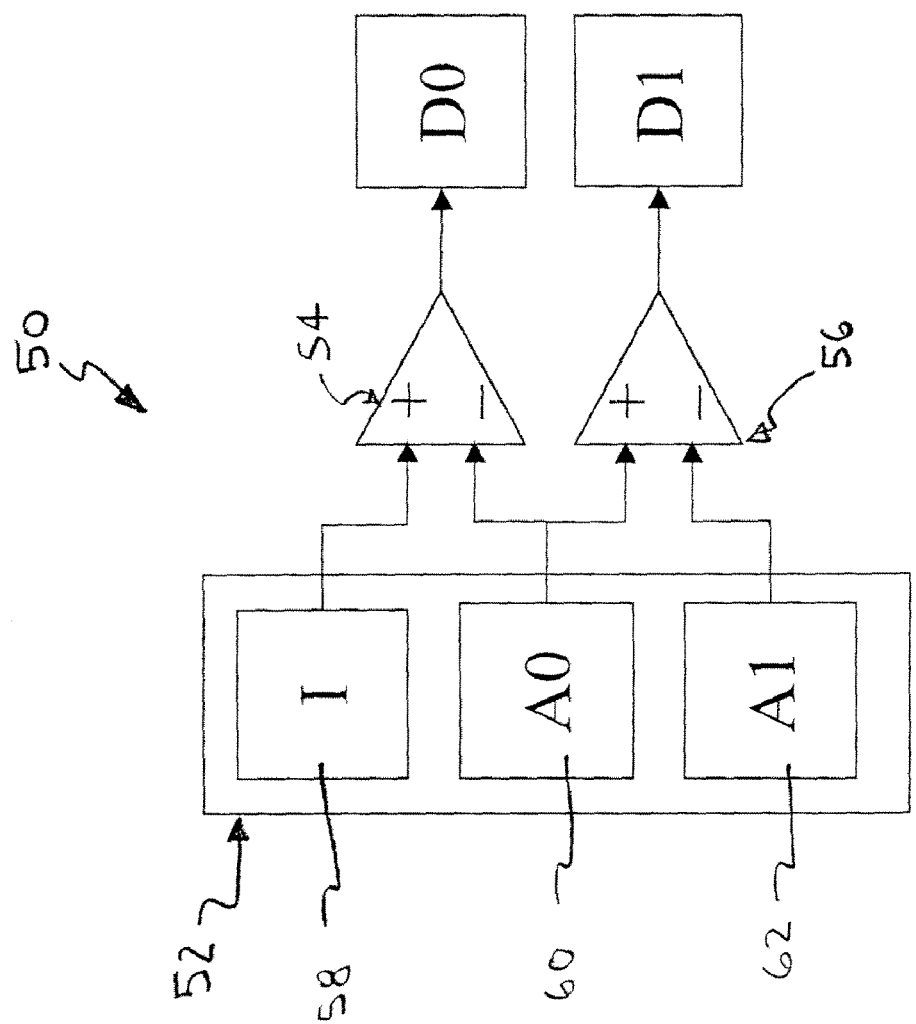
FIG. 6 illustrates an embodiment of a high-pass filter of the present invention.

Referring to FIG. 6, an embodiment of an electronic analog high-pass filter 50 is illustrated. The high-pass filter 50 includes a sensor array 52 and two differencing circuits 54 and 56. The sensor array 52 includes sensors 58, 60, and 62 that sense images I, A0, and A1, respectively. The high-pass filter 50 may includes additional sensors (e.g., A2, A3) if additional decomposition levels are needed. In operation, sensor 58 senses a pure image (I) and a first order blur (A0). The pure image (I) and the first order blur (A0) are subtracted by differencing circuit 54, resulting in a difference (D0). Similarly, sensor 62 senses a second order blur (A1). The first order blur (A0) and the second order blur (A1) are subtracted by differencing circuit 56, resulting in a difference (D1).

Figure 7:
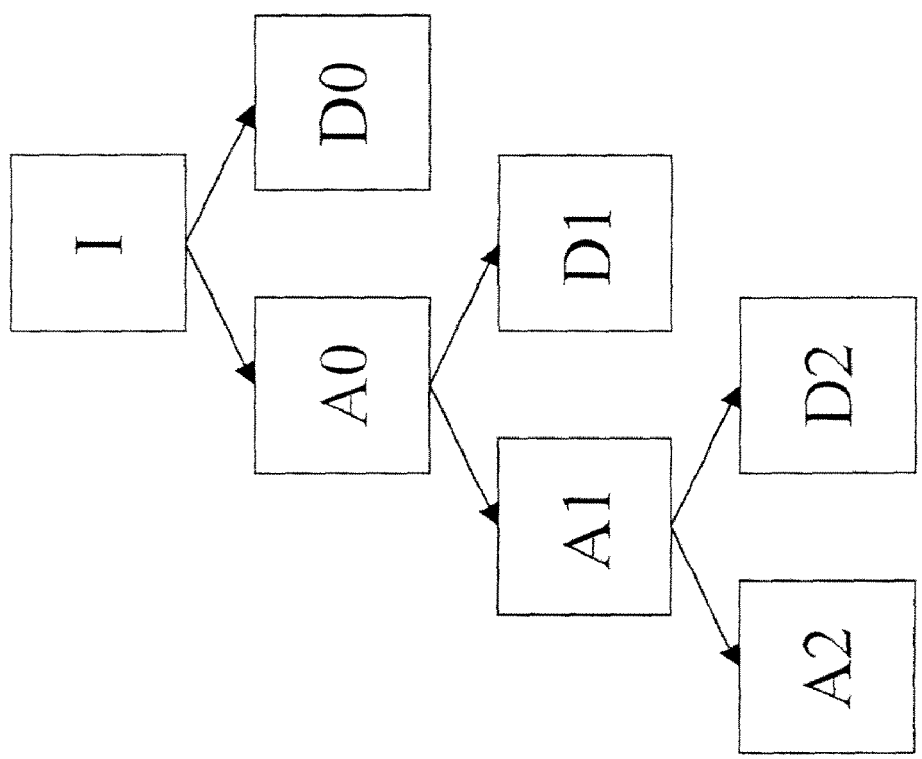
FIG. 7 illustrates the leaf nodes (difference images Dn+approximation image A2) necessary to reconstruct an image in a decoder.

Referring to FIG. 7, a tree structure is shown illustrating multiple decompositions following a similar subtraction process described above. To reconstruct image (I) the decoder will need the leaf nodes, that is, all of the difference images (Dn) and the final approximation image (A2). However, a problem arises because the data set increases with each decomposition level. Compressing such large data sets is difficult. The present invention overcomes this drawback in a manner as described below.

Figure 8:
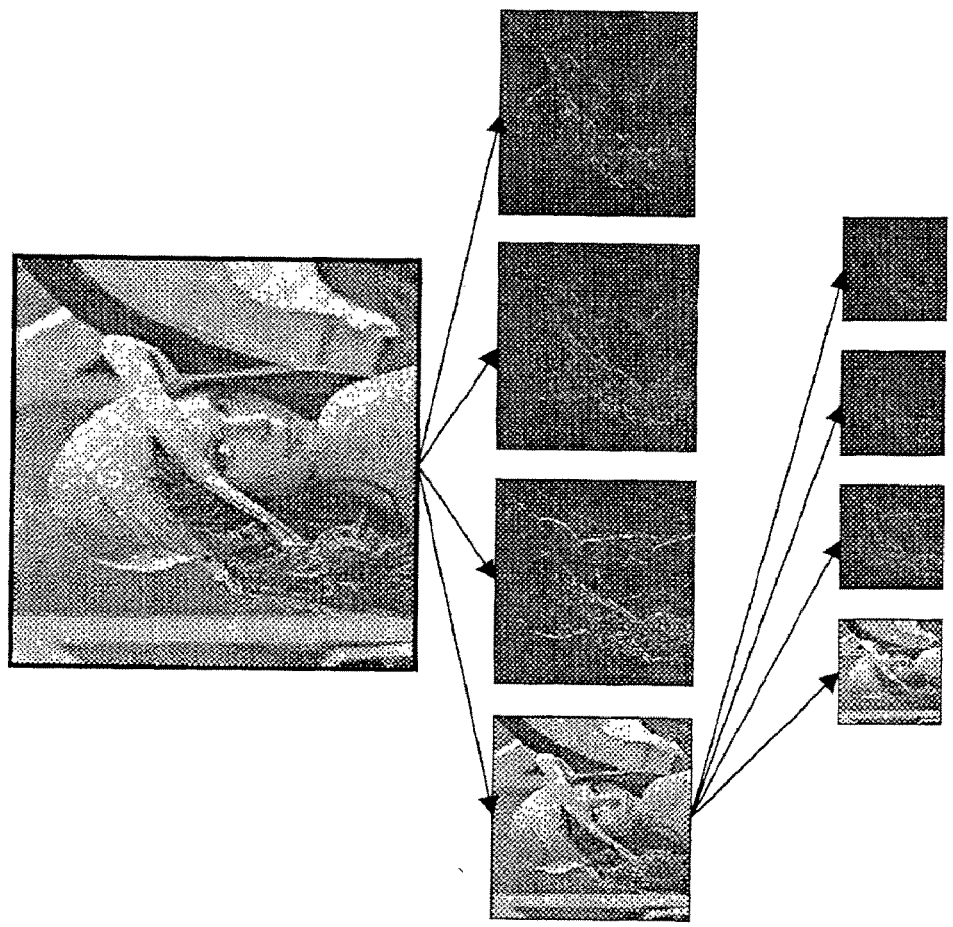
FIG. 8 illustrates that wavelet-based compression keeps the size of the transformed data set equal to the original image data set.

Referring to FIG. 8, Mallat wavelet transform decomposition is illustrated. It is apparent that the wavelet based compression process keeps the size of the transformed data set equal to the original image data set. In order to get the opto-electronic system to function start by generating an image approximation and then scale it.

Figure 9B:
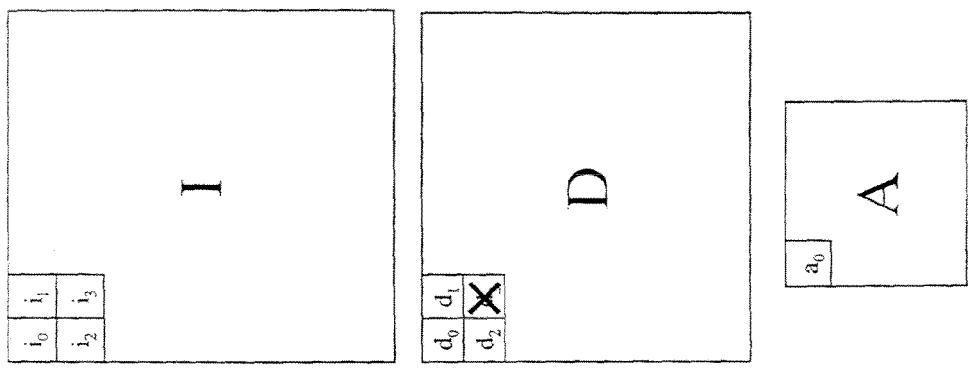
FIG. 9B is similar to FIG. 9A illustrating the development of approximations (a) and differences (d)
Figure 9A:
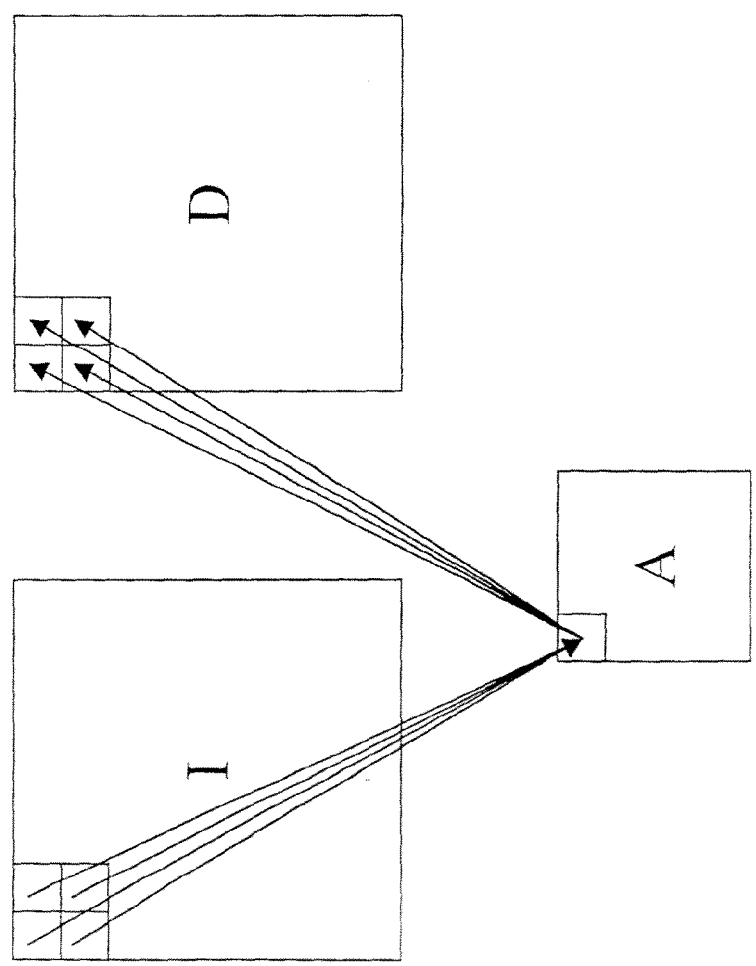
FIG. 9A illustrates the development of approximations (A) and differences (D)

Referring to FIGS. 9A and 9B, an approximation is obtained by carrying out the following general calculation:

$A_{x,y} = I_{2x,2y} + I_{2x+1,2y} + I_{2x,2y+1} + I_{2x+1,2y+1}$

The result $A_{x,y}$ from the above equation approximates the result obtained by defocusing.

Use (A) and (I) to produce the difference (D) as follows:

$D_{x,y} = I_{x,y} - A_{x,y}$
$D_{x+1,y} = I_{x+1,y} - A_{x,y}$
$D_{x,y+1} = I_{x,y+1} - A_{x,y}$
$D_{x+1,y+1} = I_{x+1,y+1} - A_{x,y}$.

The five points generated are linearly independent. Therefore, keeping the average value (A) and any three of the differences (D), the fourth point can be recovered. Referring to FIG. 9B, therefore, the following general equations can be used for encoding and decoding:

Encoding
$a_0 = i_0 + i_1 + i_2 + i_2/4$
$d_0 = i_0 - a_0$
$d_1 = i_1 - a_0$
$d_2 = i_2 - a_0$.

Decoding
$i_0^i = d_0 + a_0$
$i_1^i = d_1 + a_0$
$i_2^i = d_2 + a_0$
$i_3^i = a_0 - d_0 - d_1 - d_2$.

The resulting decomposition can be organized to look similar to the Mallat transform, i.e., there are three difference terms with the errors that were introduced and an average that looks like the original image. The next step is to determine how the computations will be performed with the opto-electronic system.

One approach to implement the above calculations is to take four images, offset them slightly, and add them. Such a procedure becomes impractical because for the pure image one lens is required, for the first blur four lenses are required, for the second blur sixteen lenses are required, for the third blur sixty-four lenses are required, etc.

Figure 10:
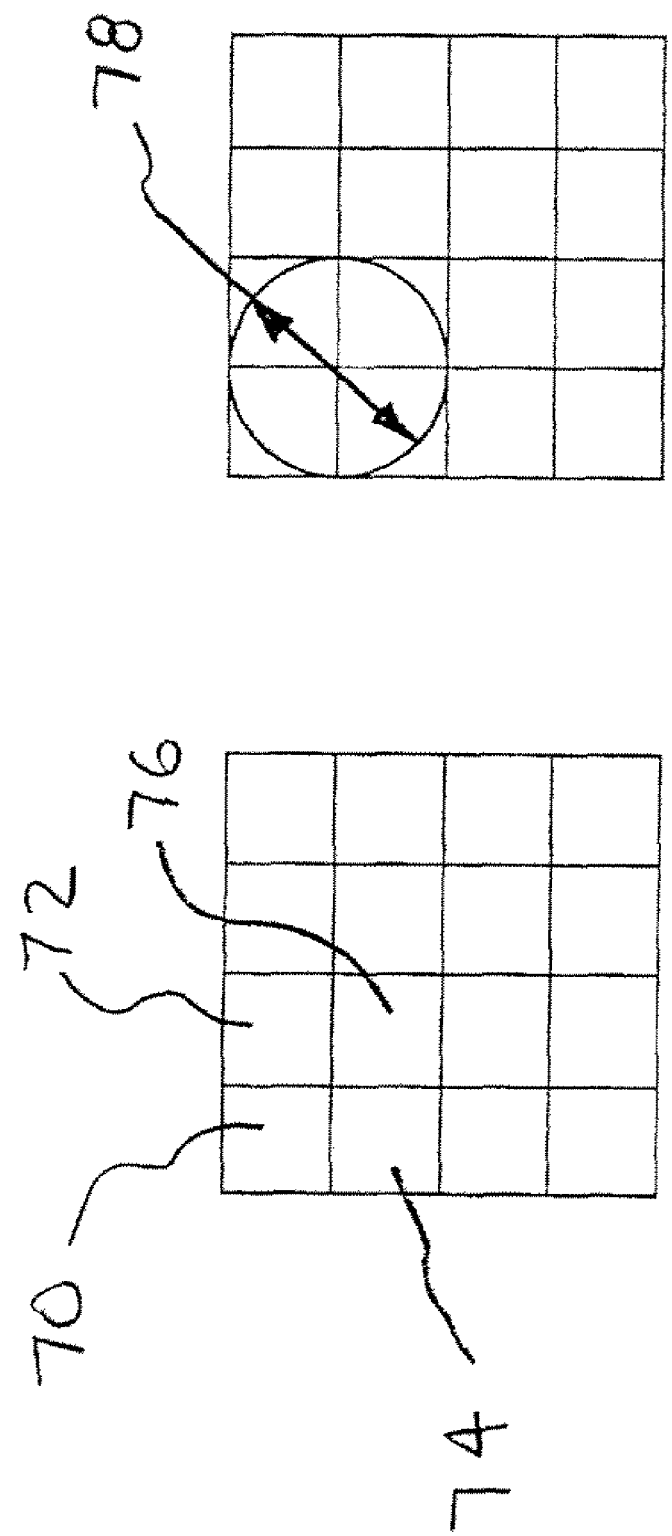
FIG. 10 illustrates that adding four offset images gives roughly the same result as defocusing with an appropriate blur diameter.

Referring to FIG. 10, to avoid the problems associated with the approach described above, blurred images are utilized, e.g., instead of using four pure focused images (pixels 70, 72, 74, and 76), adding them, and then scaling them. That is, adding four offset images gives roughly the same result as defocusing with an appropriate blur diameter 78.

The present compression technique is based on the fact that multiple images can be obtained that are blurred by predetermined amounts and registered. Several techniques are disclosed for developing blurred images with lenses and sensors. They take into consideration the limitations in optics and silicon manufacture technology.

Figure 11:
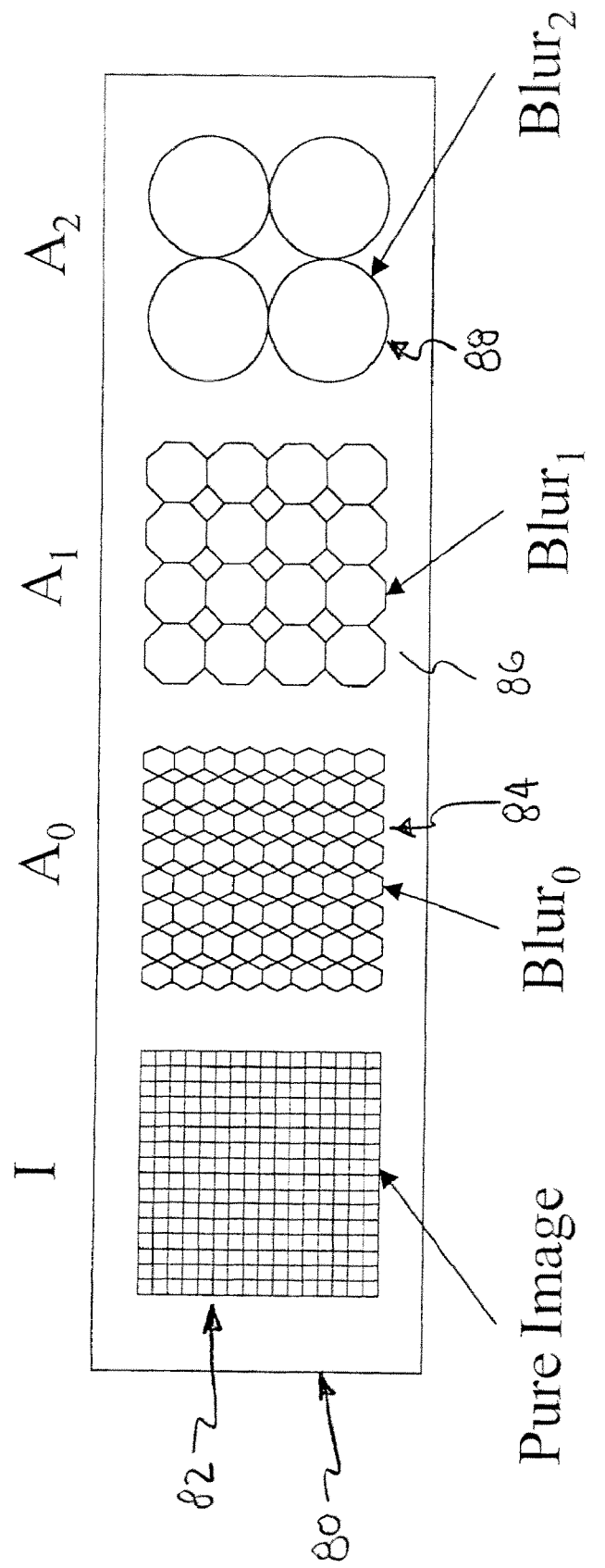
FIG. 11 illustrates a sensor array having four sensors.

Referring to FIG. 11, a sensor array is illustrated at 80. At sensor 82 a sample (I) is taken at every pixel. At sensor 84 a sample (A0) is taken at every second pixel on every second row using, for example, micro-lenses to focus the light from a larger region or using larger sensors so an average is taken over the whole area. Similarly, at sensor 86 a sample (A1) is taken at every fourth pixel on ever fourth row, and at sensor 88 a sample (A2) is taken at every sixteenth pixel on every sixteenth row. More or less approximations (An) can be used. Each dot is one pixel. It is notable that sensor 84 has one-quarter the number of pixels of sensor 82, sensor 86 has one-sixteenth the number of pixels of sensor 82, and sensor 88 has one-sixty-fourth the number of pixels of sensor 82. Therefore scaling is performed by sparsely sampling the blurred image.

Figure 12:
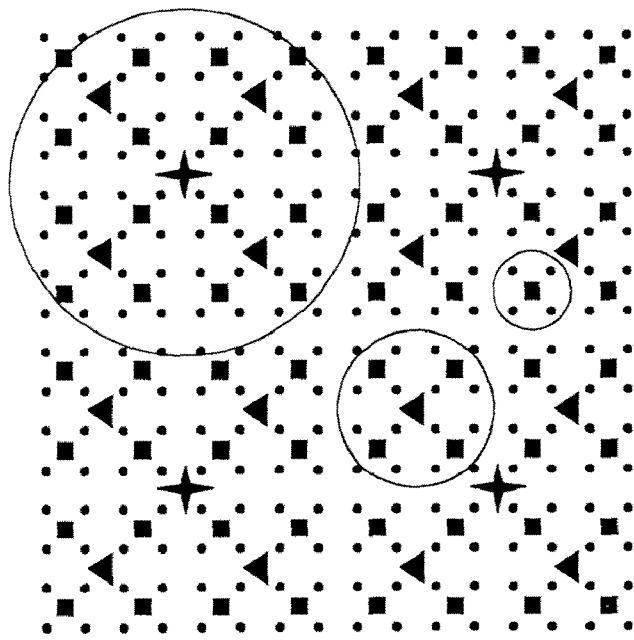
FIG. 12 illustrates how data from each sensor illustrated in FIG. 11 should "logically" align after calibration.

Images projected on sensors 82, 84, 86, and 88 should be in registration. In other words, the image (I) projected on sensor 82 should be in register with the image projected on sensor 84, etc. Registration may be ensured by a calibration procedure. For example, assume the image projected on sensor 82 and the image projected on sensor 84 are offset by a fixed amount (e.g., one row of pixels). If the system is alerted to this fact then it can compensate for the misalignment. Any misalignments can be determined by applying a test image (e.g., a square box) to determine whether each test image aligns with the others. If there is misalignment, then the system can adjust the sensor by redefining the region of interest on the misaligned image. For the above calibration system, each sensor should be slightly oversized to allow for redefining the region of interest. Referring to FIG. 12, logical alignment of the pixels of each of the four sensors shown in FIG. 11 is illustrated.

Figure 13:
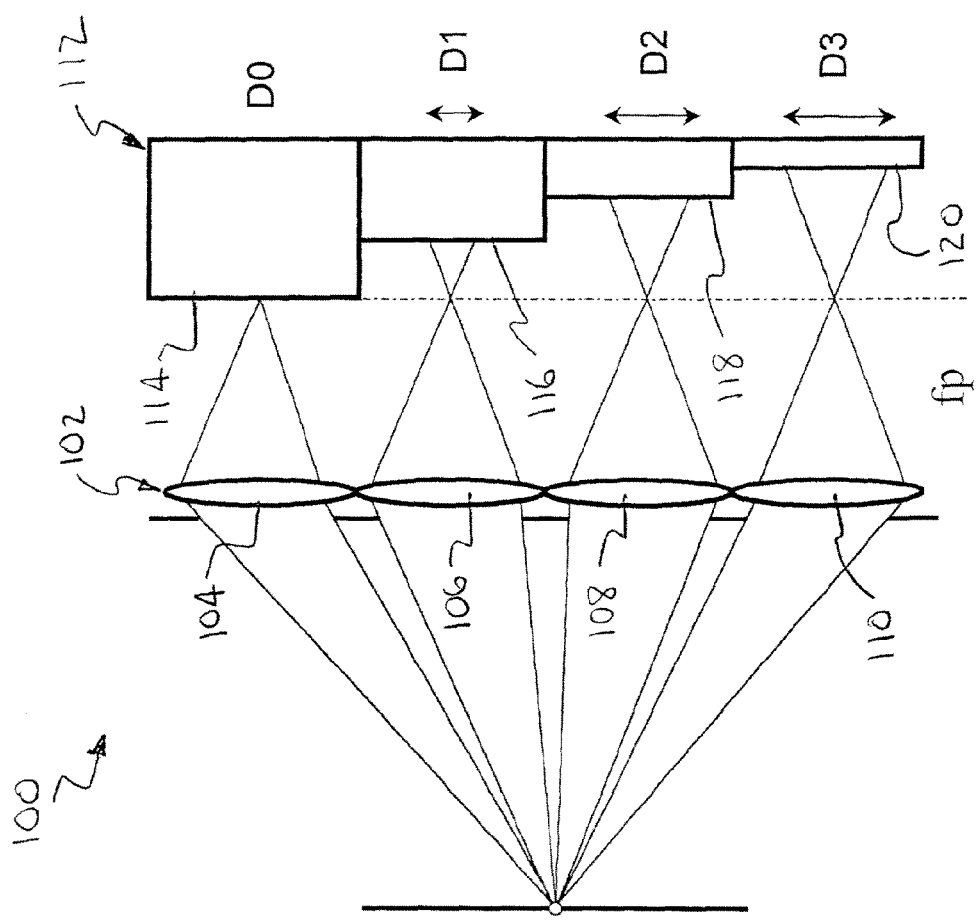
FIG. 13 illustrates a lens/sensor assembly that includes a lens element having multiple lenses with equal focal lengths and a stepped sensor array.

Referring to FIG. 13, an embodiment of a lens/sensor assembly is illustrated generally at 100. The lens/sensor assembly 100 includes a lens element 102 having four lenses 104, 106, 108, and 110, and a stepped sensor array 112 having an sensor in each of four sensor planes 114, 116, 118, and 120. The lenses in lens element 102 each have the same focal length, therefore, defocusing (D1, D2, D3) occurs at the stepped sensor array 112.

Figure 14:
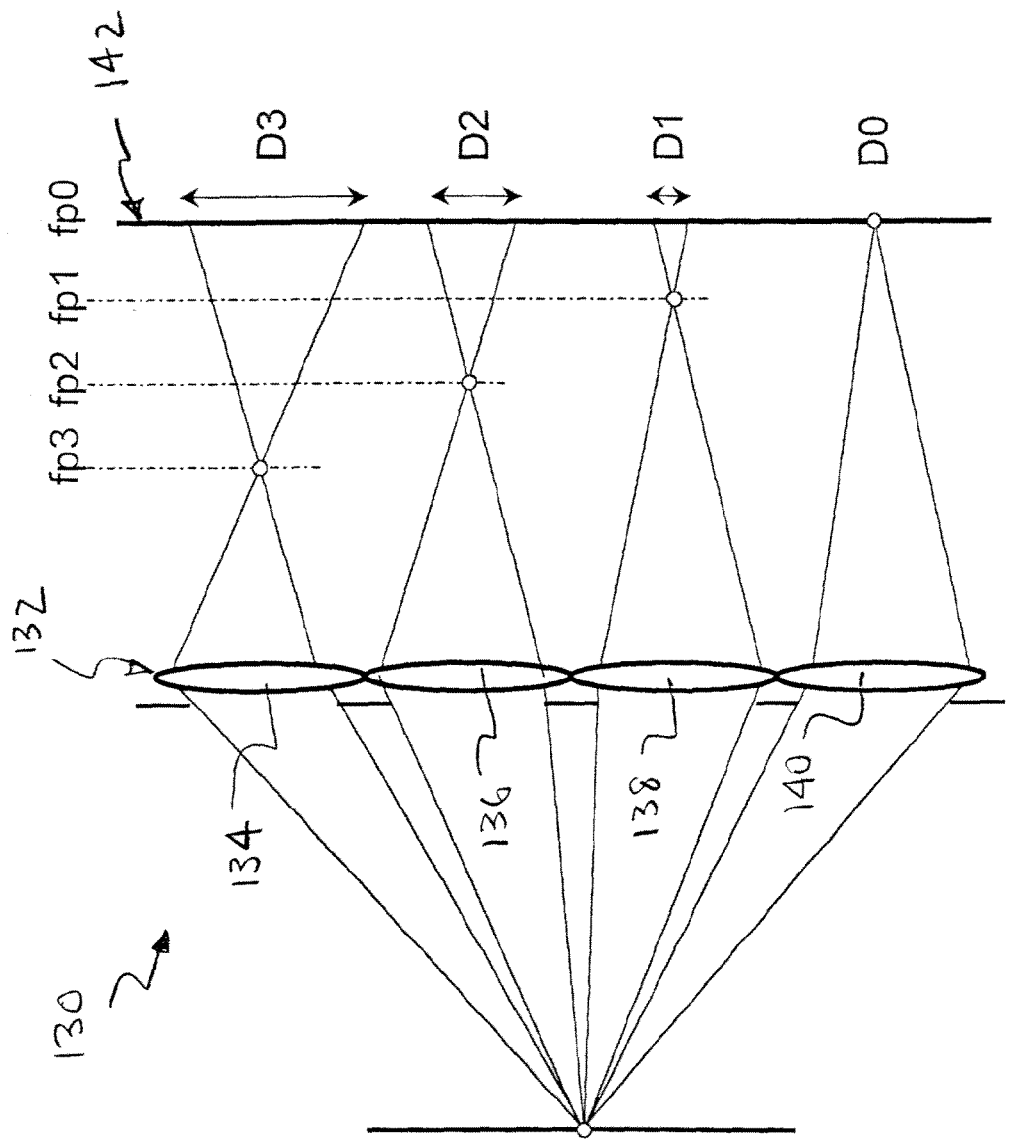
FIG. 14 illustrates a lens/sensor assembly that includes a lens element having multiple lenses, each lens having a different focal length, and a planer sensor array.

Referring to FIG. 14, an embodiment of a lens/sensor assembly is illustrated generally at 130. The lens/sensor assembly 130 includes a lens element 132 having four lenses 134, 136, 138, and 140, and a planer sensor array 142 having four image sensors in a single plain. The lenses in lens element 132 each have the different focal lengths, therefore, defocusing (D1, D2, D3) occurs at the planer sensor array 142.

EXAMPLE 1

For a multiple focal length lens system as illustrated in FIG. 14, the optical parameters can be determined using simple geometric optics. See "Modem Optical Engineering", Third Edition, Warren J. Smith, McGraw-Hill SPIE Press, 1966. Given a desired field of view (FOV) and a realistic sensor array, the parameters defining a multiple focal length lens system are as follows:
Desired FOV: 40 Degs. (this approximates the human vision system) Sensor Geometry: (taken from an Omnivision OV7620)
pixel size: 7.6×7.6 µm
image area: 4.86×3.64 mm
array: 640×640 pixels
optical format: ⅓ inch Defocus Parameter:
A0 Filter: 2*7.6 µm
A0 Filter: 4*7.6 µm
A0 Filter: 8*7.6 µm

EXAMPLE 2

For a single focal length lens system as illustrated in FIG. 13, the optical parameters defining the single focal length lens system are as follows:
FOV: 40 degrees
Sensor Dimensions(W×H): 4.86×3.64 mm
Sensor Dimensions (pixels): 640×480.
Sensor Pixel Dimensions: 7.59×7.59 µm
Aperture: 10 mm
Focal length: 6.67637 mm
DScene: 300 m
DImage: 6.67652 mm
Bfact0: 2, Bdia0: 15.1875 µm
Bfact1: 4, Bdia1: 30.375 µm
BFact2: 8, BDia2: 60.75 µm
DBlur0: 6.68666, DX0:10.14 µm
DBlur1: 6.6968, DX1:10.2799 µm
DBlur2: 6.71708, DX2:40.5599 µm.

The above results give an examples of the manufacturing tolerances that are needed in an opto-electronic transform system. Focal length differences of approximately 10 µm (i.e., Dx0: 10.14 µm) are difficult to achieve with optics. In silicon, however, such tolerances are relatively very large. Therefore, utilizing silicon technology may be the preferable manufacturing method (i.e., utilizing stepped sensors) to obtain the desired distances between the lenses and the sensors.

Typical video compression systems, e.g., MPEG compression, maintain a model for synchronization in the image domain. Such systems must inverse quantize and inverse transform for model maintenance. U.S. patent Ser. No. 09/529,849 to Nguyen et al., the contents of which are incorporated by reference herein, proposes a system for maintaining a model after the transform. This provides improved performance, however, the present invention discloses a system wherein the model is maintained after the transform and after the quantizer. As described below, significant improvements are achieved including a reduction in power consumption and an increase of 25% in performance.

The equations for implementing the quantizer and the model maintenance are as follows:
Encoding:
$I/Q = q_i$
$d_i = q_0 - q_{i-1}$
Decoding:
$q_i = d_0 - q_{i-1}$
$I' = q_i * Q$.

Utilizing the above equations it is possible to carry out the quantizer in analog.

Figure 15:
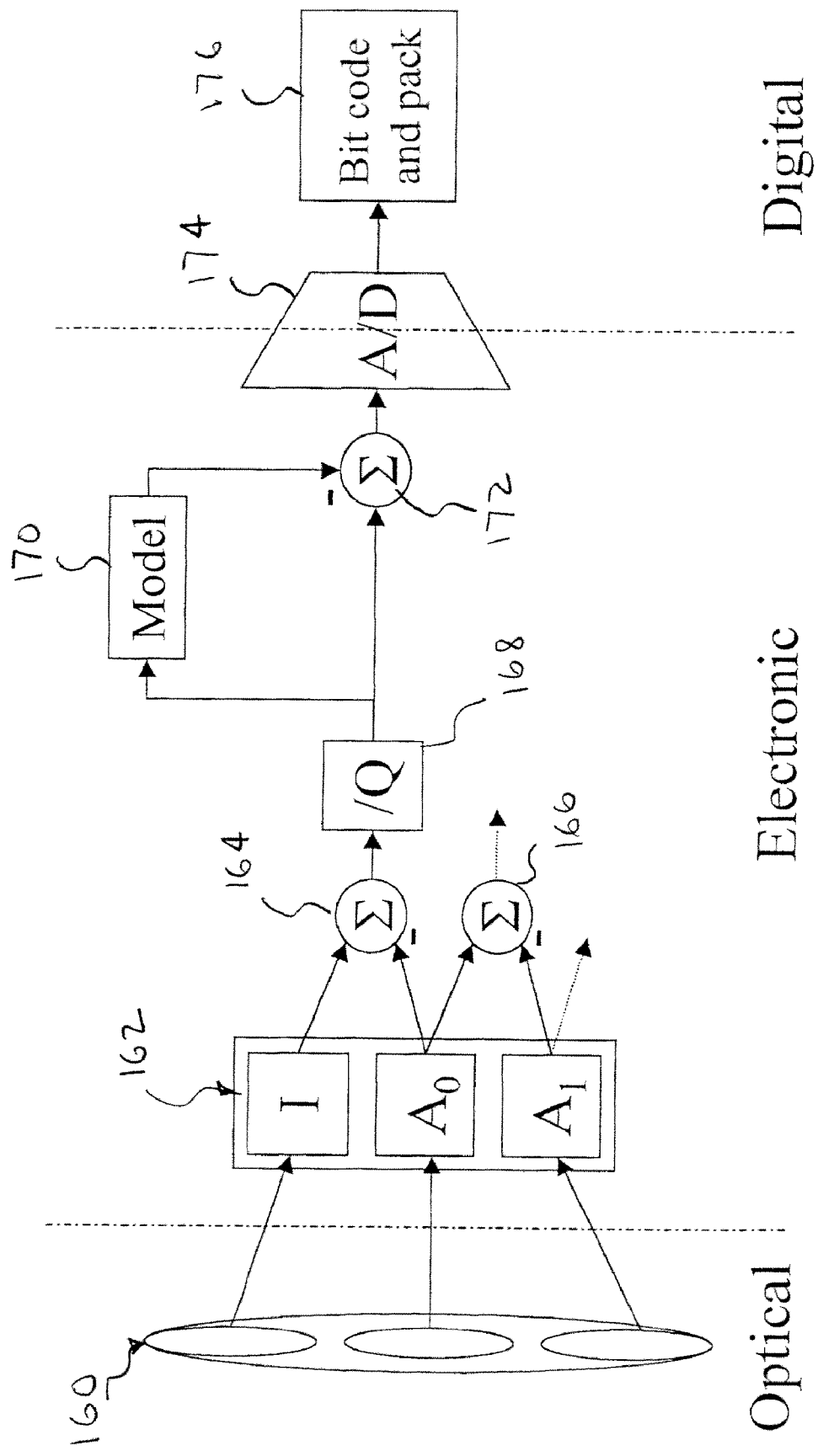
FIG. 15 illustrates an embodiment of the present invention that utilizes analog memory.

Referring to FIG. 15, an encoder is illustrated including optical, electronic, and digital portions. The optical portion includes a lens element 160 which may be a single lens or multiple lenses as described above. The optical portion carries out the low-pass function of the transform. The electrical portion includes a sensor array 162 which may be planer or stepped, depending on the configuration of the lens element 160. The sensor array 162 in combination with differencing circuits 164 and 166 carry out the high-pass function of the wavelet transform. The electrical portion further includes a quantizer 168 which may be implemented with a programmable attenuation circuit to carrying out division of coefficients by a quantize value as described above. Model maintenance is carried out in the electronic portion via signal delay 170 and works in conjunction with the quantizer 168 as implied by the above encoding equations. A differencing circuit 172 may be used to carry out subtraction of quantized values as described above. Analog signals produced by the electronic portion pass through an A/D converter 174. Thereafter, bit coding and packing 176 are carried out in the digital portion in preparation for transmitting the data.

Figure 16:
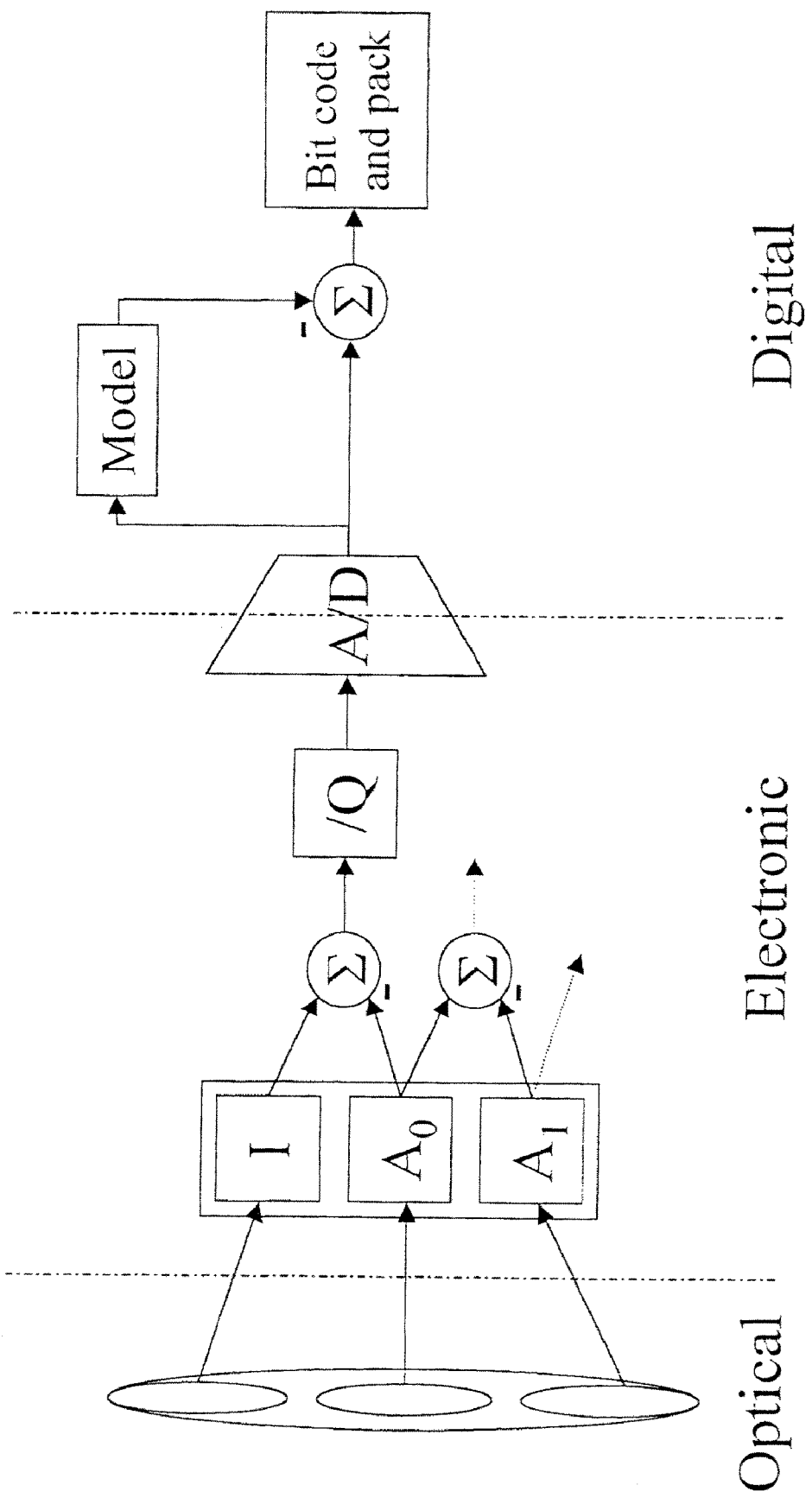
FIG. 16 illustrates an embodiment of the present invention that utilizes digital memory.

Referring to FIG. 16, an encoder is illustrated including optical, electronic, and digital portions. The encoder is substantially similar to the encoder illustrated in FIG. 15, however, model maintenance is carried out in the digital portion.

Figure 17:
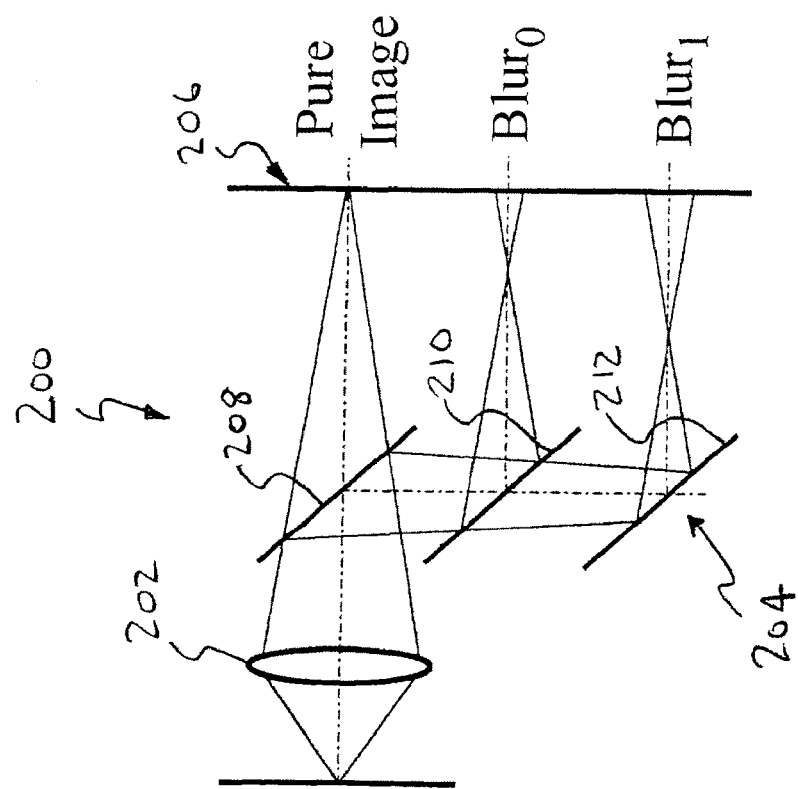
FIG. 17 illustrates a lens/sensor assembly that includes a lens, a beam splitter assembly, and a planer sensor array.

Referring to FIG. 17, a lens/sensor assembly is disclosed at 200. The lens/sensor assembly includes a lens element 202 having a single lens, a beam splitter 204, and a planer sensor array 206. The beam splitter 204 includes a first splitter 208 for allowing 50% of the image to pass to the sensor and a second beam splitter 210 for allowing 25% of the image to pass to the sensor. A front surface mirror 212 is also included for allowing the remainder of the image to pass to the planer sensor array 206. An advantage of using a beam splitter is that the images emitted therefrom are identical and not stereoscopic as would result when two separate lenses are used to product two images from the same source. Having identical images enables the system to more precisely register the images, resulting in more accurate compressed images. A possible disadvantage of using a beam splitter is that light is lost after passing through a beam splitter. For example, if the first beam splitter 208 is made to allow 50% transmission and the second beam splitter 210 is made to allow 25% transmission, then 50% of the light from the image will pass through the first beam splitter 208 (and 50% will reflect) and contact a first sensor on the array, 25% of the light from the image will reflect from the second beam splitter 210 (and 25% will pass through) and contact a second sensor on the array, and the remaining 25% of the light from the image will reflect on the front surface mirror 204 and contact a third sensor on the array.

Figure 18:
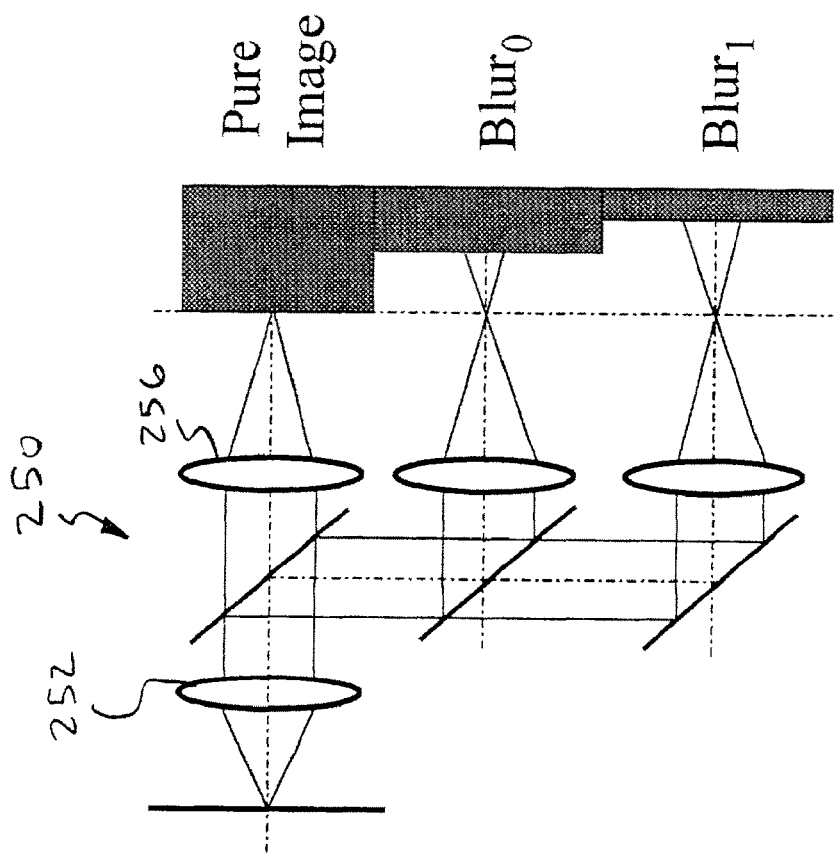
FIG. 18 illustrates a lens/sensor assembly that includes a collimating lens, a beam splitter assembly, three lenses having equal focal lengths, and a stepped sensor array.

Referring to FIG. 18, a lens/sensor assembly 250 is illustrated that includes a collimating lens 252, a beam splitter assembly 254, three lenses having equal focal lengths 256, 258, 260, and a stepped sensor array 262. The lens/sensor assembly 250 functions similar to lens/sensor assembly 100, however, it avoids the drawback of stereoscopic viewing by using the single collimating lens 252 in conjunction with the beam splitter assembly 254.

Whether a single lens lens/sensor assembly (e.g., 200 or 252) is used or a multiple lens lens/sensor assembly (e.g., 100 or 130) is used will depend on the demands placed on the optical system. For example, if the optical system is to be used on a MAV that is intended to fly at 100 meters, then whether or not the resulting image is stereoscopic or not may be irrelevant. In such case, if there is an advantage to using a multiple lens lens/sensor assembly (e.g., lighter, cheaper), then a multiple lens lens/sensor assembly can be used. If the optical system is to be used on a MAV that is intended to transmit images a meter away (e.g., a MAV designed for entering buildings) then a single lens lens/sensor assembly may need to be used.

Those having ordinary skill will appreciate that the system may be used where available light is other than visible light (e.g., IR). Those having ordinary skill in the art will also readily appreciate that technologies that spawn from MAV projects will have applications outside these projects. For example, low power, lightweight video compression systems that are designed for a MAV may be used in a portable laptop for transmitting an image of a user to another user, used in a wrist watch for transmitting video to a remote location, etc.

What is claimed is:

1. An apparatus, comprising:
an optical module configured to provide simultaneously a plurality of images of an object; and
an optical array of sensors, configured to provide output sensor signals, wherein each sensor of said optical array is configured to provide one output sensor signal of said output sensor signals in response to a corresponding one image of said plurality, wherein a first, sensor of said optical is configured to receive a first image of said plurality of images focused on said first sensor, and one or more other sensors of said optical array are configured to receive one or more other images of said plurality of images defocused on each sensor of said one or more other sensors with an image blur size consecutively increased on said one or more other sensors by a predefined value relative to an image focal size on said first sensor, such that said one or more other sensors have a number at required pixels consecutively decreased by a square of said predefined value compared to the first sensor;
wherein said output sensor signals are for a video data compression using differencing and digitizing in an analog domain, and further for digital coding and transmitting said images in a digital domain.

2. The apparatus of claim 1, wherein said optical module comprises a lens and beam splitters for providing said plurality of images, wherein a number of said beam splitters equals a number of said optical sensors.

3. The apparatus of claim 1, wherein said optical module comprises a lens splitters,and further lenses for providing said plurality of images, wherein a number of beam splitters equals number of further lenses and equals a number of said optical sensors.

4. The apparatus of claim 1, wherein said optical array of sensors is a stepped array wherein each step of said stepped array separates adjacent sensors.

5. The apparatus of claim 1, wherein said predefined value equals two.

6. The apparatus of claim 1, wherein said optical module comprises lenses for providing said plurality of images, wherein a number of said lenses equals a number of said optical sensors.

7. The apparatus of claim 6, wherein each lens of said lenses has the same focal length and said optical array of sensors is a stepped array, wherein each step of said stepped array separates adjacent sensors.

8. The apparatus of claim 6, wherein each lens of said lenses has a different focal length and said optical array is a planar array.

9. The apparatus of claim 1, further comprising:
one or more differencing elements, responsive to said output sensor signals, configured to provide difference signals, wherein each of said one or more differencing elements is configured to providing a difference signal of said difference signals using corresponding coefficients of co-located pixels of two adjacent sensors of said optical arrays of sensors in order to carry out a high-pass function of a wavelet transform.

10. The apparatus of claim 9,further comprising,
one or more quantizing elements, responsive to said difference signals, configured to divide said difference signals by a quantizing coefficient to provide quantized signals.

11. The apparatus of claim 9, wherein the quantizing coefficient is programmable and said one or more quantizing elements are programmable attenuation circuits.

12. The apparatus of claim 10, further comprising
one or more delay elements and one or more further difference elements, responsive to said quantized signals, configured to perform model maintenance of said quantized signals before or after converting said quantized signal from analog to digital domain.

13. A method, comprising:
providing simultaneously a plurality of images of an object by an optical module; and
providing output sensor signals by an optical array of sensors in response to said plurality of images;
wherein each sensor of said optical array is configured to provide an output sensor signal of said output sensor signals in response to a corresponding image of said plurality of images, wherein a first sensor of said optical array is configured to receive a first image of said plurality of images focused on said first sensor, and one or more other sensors of said optical array are configured to receive one or more other images of said plurality of images defocused on each sensor of said one or more other sensors with an image blur size consecutively increased on said one or more other sensors by a predefined value relative to a image Ideal size on said first sensor, such that said one or more other sensors have a number of required pixels consecutively decreased by a square of the predefined value compared to the first sensor; and
wherein output sensor signals of said optical array are for a video data compression using electronic differencing in an analog domain with further digitizing and transmitting said images in a digital domain, 14. The method of claim 13, further comprising:
providing difference signals by one or more differencing elements in response to said output sensor signals, wherein each of said one or more differencing elements is configured to provide a differencing signal of said difference signals using corresponding coefficients of co-located pixels of two adjacent sensors of said optical arrays of sensors in order to carry out a high-pass function of a wavelet transform.

15. The method of claim 13, further comprising:
providing quantized signals by one or more quantizing elements in response to said difference signals by dividing said difference signals by a quantizing coefficient.

16. The method of claim 13, wherein said optical module comprises a lens and beam splitters for providing said plurality of images, wherein a number of said beam splitters equals a number of said optical sensors.

17. The method of claim 13, wherein said optical module comprises a lens, beam splitters and further lenses for providing said plurality of images, wherein a number of the beam splitters equals a number of further lenses and equals a number of said optical sensors.

18. The apparatus of claim 1, wherein said optical array of sensors is a stepped array, wherein each step of said stepped array separates adjacent sensors.

19. The method of claim 13, wherein said predefined value equals two.

20. The method of claim 13, wherein said optical module comprises lenses for providing said plurality of images, wherein a number of said lenses equals a number of said optical sensors and wherein optical array is a planar array or stepped array, wherein each step of said stepped array separates adjacent sensors.

* * * * *

UNITED STATES PATENT AND TRADEMARK OFFICE
CERTIFICATE OF CORRECTION

| | | |
|---|---|---|
| PATENT NO. | : 8,170,098 B2 | Page 1 of 1 |
| APPLICATION NO. | : 12/250261 | |
| DATED | : May 1, 2012 | |
| INVENTOR(S) | : Joel A. Rosiene et al. | |

It is certified that error appears in the above-identified patent and that said Letters Patent is hereby corrected as shown below:

In claim 1, column 10, line 13, remove the "," in between "first" and "sensor"

In claim 1, column 10, line 23, replace "number at" with "number of"

In claim 3, column 10, line 35, replace "a lens splitters, and further" with "a lens, beam splitters, and further"

In claim 4, column 10, line 40, replace "is a stepped array wherein each" with "is a stepped array, wherein each"

In claim 10, column 10, line 64, add a space between "claim 9," and "further"

In claim 10, column 10, line 64, replace "further comprising," with "further comprising:"

In claim 12, column 11, line 4, replace "The apparatus of claim 10, further comprising" with "The apparatus of claim 10, further comprising:"

In claim 13, column 11, line 26, replace "relative to a image Ideal size" with "relative to a image focal size"

In claim 13, column 11, line 34, replace "digital domain," with "digital domain."

Signed and Sealed this
Eighth Day of January, 2013

David J. Kappos
*Director of the United States Patent and Trademark Office*